(12) United States Patent
Gill et al.

(10) Patent No.: US 11,988,617 B2
(45) Date of Patent: May 21, 2024

(54) X-RAY UNIT TECHNOLOGY MODULES AND AUTOMATED APPLICATION TRAINING

(71) Applicant: John Bean Technologies Corporation, Chicago, IL (US)

(72) Inventors: Jeffrey C. Gill, Stone Ridge, NY (US); Amer M. Butt, Williamsville, NY (US); Richard D. Timperio, Catskill, NY (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 17/626,624

(22) PCT Filed: Aug. 18, 2020

(86) PCT No.: PCT/US2020/046804
§ 371 (c)(1),
(2) Date: Jan. 12, 2022

(87) PCT Pub. No.: WO2021/034829
PCT Pub. Date: Feb. 25, 2021

(65) Prior Publication Data
US 2022/0317063 A1    Oct. 6, 2022

Related U.S. Application Data

(60) Provisional application No. 62/890,484, filed on Aug. 22, 2019.

(51) Int. Cl.
*G01N 23/087*    (2018.01)
*G01N 23/083*    (2018.01)
(Continued)

(52) U.S. Cl.
CPC ........... *G01N 23/18* (2013.01); *G01N 23/083* (2013.01); *G01N 23/087* (2013.01); *G01V 5/223* (2024.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 6,212,257 B1 * 4/2001 Mattern ................. H01J 35/24
378/144
6,272,437 B1 * 8/2001 Woods ................... G07C 3/146
700/110

(Continued)

FOREIGN PATENT DOCUMENTS

GB        2 374 267 A    10/2002
WO    2018/013763 A1     1/2018

OTHER PUBLICATIONS

International Search Report and Written Opinion dated Dec. 23, 2020, issued in corresponding International Application No. PCT/US2020/046804, filed Aug. 18, 2020, 14 pages.

(Continued)

*Primary Examiner* — Allen C. Ho
(74) *Attorney, Agent, or Firm* — Christensen O'Connor Johnson Kindness PLLC

(57) ABSTRACT

A scanner comprises an electromagnetic wave source; and a detector positioned to measure emissions from the electromagnetic wave source, wherein the electromagnetic wave source comprises a first technology, and the electromagnetic wave source is interchangeable with a second electromagnetic wave source comprising a second technology and/or wherein the detector comprises a first technology, and the (Continued)

detector is interchangeable with a second detector comprising a second technology. Training the scanner to inspect for contaminants includes generating electromagnetic wave emissions at a plurality of combinations of parameters; moving a conveyor belt to expose product having a plurality of contaminants of different sizes to the emissions generated at more than one combination of parameters; recording attenuated emissions that pass through the product at more than one combination of parameters; and selecting a combination of parameters to use when inspecting for the contaminant.

15 Claims, 6 Drawing Sheets

(51) Int. Cl.
G01N 23/18 (2018.01)
G01V 5/22 (2024.01)

(52) U.S. Cl.
CPC .. G01N 2223/04 (2013.01); G01N 2223/1016 (2013.01); G01N 2223/3307 (2013.01); G01N 2223/3308 (2013.01); G01N 2223/505 (2013.01); G01N 2223/618 (2013.01); G01N 2223/643 (2013.01)

(58) Field of Classification Search
CPC .... G01N 23/10; G01N 23/18; G01N 2223/04; G01N 2223/045; G01N 2223/1016; G01N 2223/33; G01N 2223/3307; G01N 2223/3308; G01N 2223/501; G01N 2223/5015; G01N 2223/504; G01N 2223/505; G01N 2223/5055; G01N 2223/618; G01N 2223/643; G01V 5/0033; G01V 5/005; G01V 5/0066
USPC .......... 378/19, 53, 54, 56–58, 62, 98.8, 115, 378/116, 189, 196–198, 207; 250/370.09
See application file for complete search history.

(56) References Cited

U.S. PATENT DOCUMENTS

| | | | | |
|---|---|---|---|---|
| 6,883,963 B2* | 4/2005 | Nolewaika | ............ | A61B 6/032 250/370.15 |
| 7,110,502 B2* | 9/2006 | Tsuji | ............ | A61B 6/5235 378/116 |
| 7,197,112 B2* | 3/2007 | Maschke | ............ | A61B 6/547 378/189 |
| 7,290,929 B2* | 11/2007 | Smith | ............ | H05G 1/02 378/140 |
| 7,450,686 B2* | 11/2008 | Ainsworth | ............ | G01N 33/02 378/57 |
| 7,748,901 B2* | 7/2010 | Markoff | ............ | G01R 27/2605 378/207 |
| 8,243,882 B2* | 8/2012 | Jabri | ............ | A61B 6/4494 378/116 |
| 8,243,883 B2* | 8/2012 | Omernick | ............ | G01T 7/00 378/116 |
| 8,483,475 B2* | 7/2013 | Kabumoto | ............ | G01N 21/3581 382/141 |
| 8,494,210 B2* | 7/2013 | Gudmundson | ............ | G01V 5/0083 378/57 |
| 8,848,872 B2* | 9/2014 | Lee | ............ | G03B 42/04 378/116 |
| 9,134,436 B2* | 9/2015 | Kwak | ............ | G01T 1/175 |
| 9,217,720 B2* | 12/2015 | Prentice | ............ | G01N 23/083 |
| 9,939,550 B2* | 4/2018 | Clayton | ............ | G01V 5/0091 |
| 10,006,873 B1* | 6/2018 | Davis, III | ............ | G01N 33/12 |
| 10,015,872 B2* | 7/2018 | Diehm | ............ | H05G 1/02 |
| 10,058,297 B2* | 8/2018 | Park | ............ | A61B 6/461 |
| 10,098,216 B2* | 10/2018 | Kabumoto | ............ | H05G 1/26 |
| 10,219,766 B2* | 3/2019 | Park | ............ | A61B 6/461 |
| 10,251,619 B2* | 4/2019 | Park | ............ | H05G 1/56 |
| 10,258,307 B2* | 4/2019 | Park | ............ | A61B 6/547 |
| 10,376,926 B2* | 8/2019 | Makino | ............ | B07C 5/3416 |
| 10,422,757 B2* | 9/2019 | Sugimoto | ............ | G06T 7/0004 |
| 10,502,698 B2* | 12/2019 | Yamakawa | ............ | G01N 23/18 |
| 10,667,781 B2* | 6/2020 | Ikhlef | ............ | A61B 6/03 |
| 10,697,904 B2* | 6/2020 | Yamakawa | ............ | G01N 23/04 |
| 10,702,229 B2* | 7/2020 | Lee | ............ | A61B 6/467 |
| 10,718,725 B2* | 7/2020 | Miyazaki | ............ | G06T 7/0008 |
| 10,754,057 B2* | 8/2020 | Bendahan | ............ | G01V 5/224 |
| 11,009,470 B2* | 5/2021 | Yamakawa | ............ | G01N 23/083 |
| 11,016,040 B2* | 5/2021 | Yamakawa | ............ | A61B 6/5282 |
| 11,147,149 B2* | 10/2021 | Nishimura | ............ | G01N 23/04 |
| 11,189,058 B2* | 11/2021 | Kubo | ............ | G01N 23/18 |
| 11,331,068 B2* | 5/2022 | Yamakawa | ............ | G01N 23/087 |
| 11,598,729 B2* | 3/2023 | Sugimoto | ............ | G01N 23/04 |
| 2014/0270034 A1 | 9/2014 | Clayton et al. | | |

OTHER PUBLICATIONS

Communication Pursuant to Article 94(3) mailed Apr. 11, 2024, issued in corresponding European Patent Application No. 20765146. 4, filed Jan. 19, 2022, 7 pages.

* cited by examiner

X-RAY UNIT TECHNOLOGY MODULES AND AUTOMATED APPLICATION TRAINING

BACKGROUND

X-ray scanners have a given X-ray source and detector technology. The technology with which the scanner is provided cannot be easily upgraded or changed to provide the most effective or optimal technology for the scanning application. When new technology is available most often the older units are obsoleted and new equipment would need to be purchased, in some cases before the units have reached the end of their useful life. Furthermore, applications for specific product inspections are time consuming to setup. Setting up an application for inspection of a particular product or for a particular defect requires running samples many times at different settings. Conditions also change over time which are difficult to accommodate and therefore can change the optimal settings.

SUMMARY

A technology agnostic scanner design is disclosed which can accept many vision technologies or sources by the removal and insertion of technology modules. These modules will upgrade the system to new levels of performance or for a higher performance on the application.

In one embodiment, a unique design of the scanner chassis allows for insertion of technology modules which can easily upgrade the unit to different performance levels. Technology modules such as different types of x-ray sources and detectors can be inserted into the mechanical housing of the scanner in such a way that little adjustment is required beyond routine alignment. This feature provides the ability to use different types of electromagnetic wave source and detector combinations to best suit the particular inspection application. The scanner also allows for future technologies to be applied quickly as they emerge.

In one embodiment, an automated application training method is provided where the control system including one or more central processing units and storage medium will perform a series of tests on the product to optimize the settings of the scanner. The training method provides the settings for the electromagnetic wave source, the detector, conveyor belt speed, vision algorithms, among others.

The ability to insert different and new technologies via component modules provides an advantage to be able to adapt to new requirements and technology more quickly and without replacing the entire scanner or undergoing a time consuming and costly overhaul.

In one embodiment, a scanner comprises an electromagnetic wave source; and a detector positioned to measure emissions from the electromagnetic wave source, wherein the electromagnetic wave source comprises a first technology, and the electromagnetic wave source is interchangeable with a second electromagnetic wave source comprising a second technology.

In one embodiment, the first and second technology comprise different wavelengths from the electromagnetic spectrum.

In one embodiment, the scanner further comprises a conveyor belt interposed between the electromagnetic wave source and the detector.

In one embodiment, the detector comprises a first technology, and the detector is interchangeable with a second detector comprising a second technology.

In one embodiment, the electromagnetic wave source is an X-ray source.

In one embodiment, the detector comprises photodiode arrays and other technologies.

In one embodiment, the scanner is configured to communicate with a storage medium having instructions stored thereon to perform a method for training the scanner for an inspection application, the method comprising: with a control system, operating the electromagnetic wave source to generate electromagnetic wave emissions at a plurality of combinations of parameters; with the control system, moving a conveyor belt to expose product having a plurality of contaminants of different sizes to the emissions generated at more than one combination of parameters; with the control system, recording attenuated emissions that pass through the product at more than one combination of parameters; and with the control system, selecting a combination of parameters to use when inspecting for the contaminant.

In one embodiment, the storage medium is a remote storage medium.

In one embodiment, a tangible computer readable medium having instructions stored thereon to perform a method for training a scanner for an inspection application, the method comprising: with a control system, operating an electromagnetic wave source to generate electromagnetic wave emissions at a plurality of combinations of parameters; with the control system, moving a conveyor belt to expose product having a plurality of contaminants of different sizes to the emissions generated at more than one combination of parameters; with the control system, recording attenuated emissions that pass through the product at more than one combination of parameters; and with the control system, selecting a combination of parameters to use when inspecting for the contaminant.

In one embodiment, a method for training a scanner to perform an inspection application, the method comprising: operating an electromagnetic wave source to generate electromagnetic wave emissions at a plurality of combinations of parameters; moving a conveyor belt to expose product having a plurality of contaminants of different sizes to the emissions generated at more than one combination of parameters; recording attenuated emissions that pass through the product at more than one combination of parameters; and selecting a combination of parameters to use when inspecting for the contaminant.

In one embodiment, the method further comprises placing a test card containing the contaminants of different sizes beneath the product.

In one embodiment, the method further comprises reversing the direction of the conveyor belt after exposing the product to the emissions after each of the more than one combinations of parameters.

In one embodiment, the electromagnetic wave source is an X-ray source.

In one embodiment, a control system sets the combinations of parameters.

In one embodiment, a scanner comprises an electromagnetic wave source; and a detector positioned to measure emissions from the electromagnetic wave source, wherein the detector comprises a first technology, and the detector is interchangeable with a second detector comprising a second technology.

In one embodiment, detector technologies are selected from the group consisting of photodiode arrays, CCD, and CMOS.

In one embodiment, the scanner is configured to communicate with a storage medium having instructions stored thereon to perform a method for training the scanner for an inspection application, the method comprising: with a control system, operating the electromagnetic wave source to generate electromagnetic wave emissions at a plurality of combinations of parameters; with the control system, moving a conveyor belt to expose conforming product to the emissions generated at more than one combination of parameters; with the control system, recording attenuated emissions that pass through the conforming product at more than one combination of parameters; and with the control system, selecting a combination of parameters to use when inspecting product unknown to be conforming.

In one embodiment, a tangible computer readable medium having instructions stored thereon to perform a method for training a scanner for an inspection application, the method comprising: with a control system operating an electromagnetic wave source to generate electromagnetic wave emissions at a plurality of combinations of parameters; with the control system, moving a conveyor belt to expose conforming product to the emissions generated at more than one combination of parameters; with the control system, recording attenuated emissions that pass through the conforming product at more than one combination of parameters; and with the control system, selecting a combination of parameters to use when inspecting product unknown to be conforming.

In one embodiment, a method for training a scanner to perform an inspection application, the method comprising: operating an electromagnetic wave source to generate electromagnetic wave emissions at a plurality of combinations of parameters; moving a conveyor belt to expose conforming product to the emissions generated at more than one combination of parameters; recording attenuated emissions that pass through the conforming product at more than one combination of parameters; and selecting a combination of parameters to use when inspecting product unknown to be conforming.

In one embodiment, the method further comprises selecting data from the recorded attenuated emissions that defines a conforming product.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
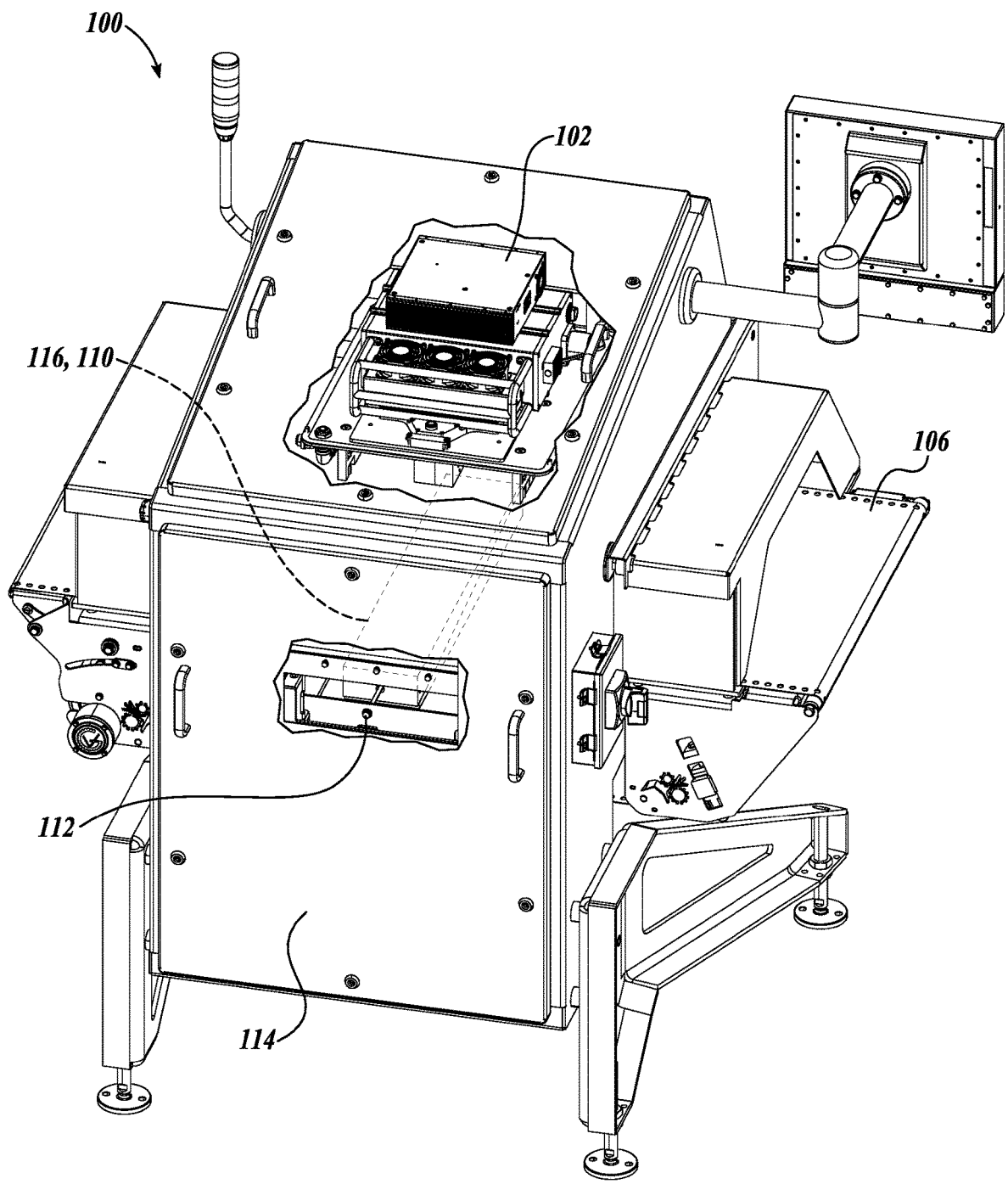
FIG. 1 is a diagrammatical illustration of a scanner according to one embodiment of the disclosure.

Referring to FIG. 1, an electromagnetic wave scanner, such as an X-ray scanner 100, is comprised in part of an electromagnetic wave (X-ray) source 102 and detector 110. In general, these components have a wide range of options, configurations and technologies.

With respect to X-rays, there are different types of available technologies used to generate X-rays. Even different methods and designs exist for a similar technology. The X-ray source might, for example, use an X-ray tube in the source, however, the tube design and internal materials can be different and thus produce different characteristics in the radiation. The present disclosure provides a scanner that has interchangeable electromagnetic wave sources 102 and/or detectors 110, including different technologies to generate and detect X-rays, as well as other electromagnetic wave radiation.

Cutaway views show the placement of the electromagnetic wave source 102 above a conveyor belt 106. In this disclosure, a representative electromagnetic wave source 102 is described as an X-ray source, however, it is possible to use other electromagnetic wave sources other than X-ray. FIG. 1 also shows the placement of an X-ray detector 110 below the conveyor belt 106. Accordingly, the radiation emitted from the X-ray source 102 passes through any products being carried on the conveyor belt 106, and is then detected by the detector 110. The detector 110 contains scintillating materials that generate visible light when struck by X-rays. The light is detected by photodiodes. The intensity of the light depends on the extent the X-rays have been attenuated while passing through the product. Any anomaly, such as foreign matter or a contaminant, will be distinguishable from the response in the light detection.

The range of applications, products and the range of contaminants for inspection is extensive, and therefore the need to have a system designed to quickly change to a different type of technology and/or component is needed. In this disclosure, the scanner 100 is designed such that the X-ray source 102 and detector 110 components are quickly exchangeable with components that are the same or with components that use different technologies. For example, either one or both of the X-ray source 102 and detector 110 can be replaced with any other electromagnetic wave source and detector operating in a different wavelength range of the electromagnetic spectrum, such as, UV, IR, visible light, microwaves, radio waves, and the like. In addition, either one or both of the X-ray source 102 and detector 110 can be replaced with any other X-ray source 102 and detector 110 that uses a new or different technology. For example, a photodiode array detector can be replaced with a detector using semiconductors including selenium or cadmium, for example.

Figure 2:
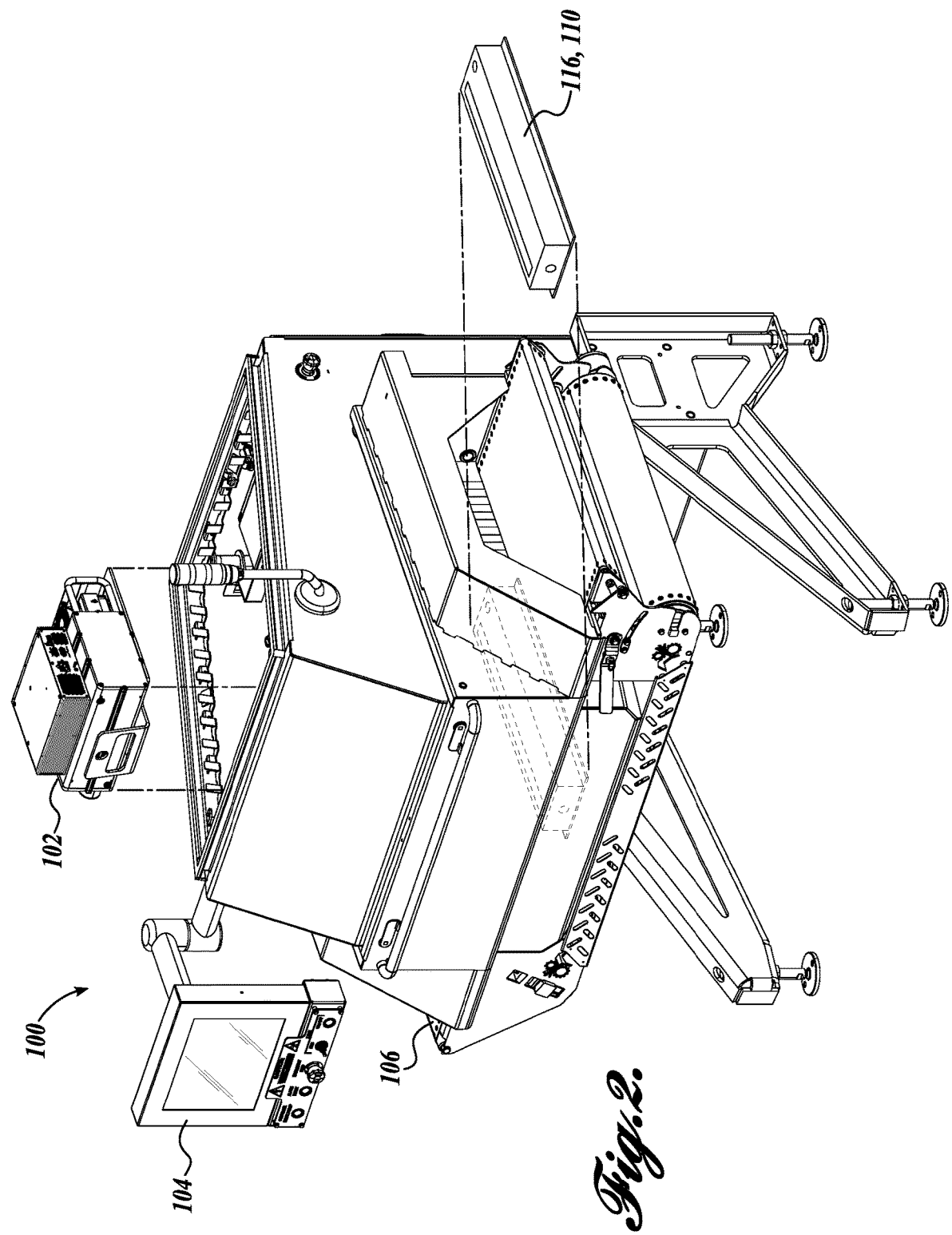
FIG. 2 is a diagrammatical illustration of a scanner of FIG. 1.

Referring to FIG. 1, in one embodiment, the detector 110 is removed by loosening a screw 112 and sliding a cartridge 116 containing the detector 110 out from the scanner 100 as shown in FIG. 2 after the removal of cover(s) 114.

In one embodiment, the detector 110 rests inside the cartridge 116 that can accommodate different shapes and sizes of detectors. Each new detector that can fit within the cartridge 116 can accept the screw 112 and is built so that upon resting on the cartridge, the detecting elements are in the same location for every other detector using different technology, so that alignment of the detector is minimal or unnecessary.

In one embodiment, several types and designs of detectors 110 can be made in the same housing size to fit within the same cartridge 116 so as to be interchangeable. This will enhance the swap of detector 110 components in the event the detector 110 needs a change for updating the technology.

In one embodiment, the detector 110 can include an edge card connector or any other standard connector to allow the detector 110 to plug into a matching socket on the scanner 100 to communicate to other components in the scanner 100.

Figure 3:
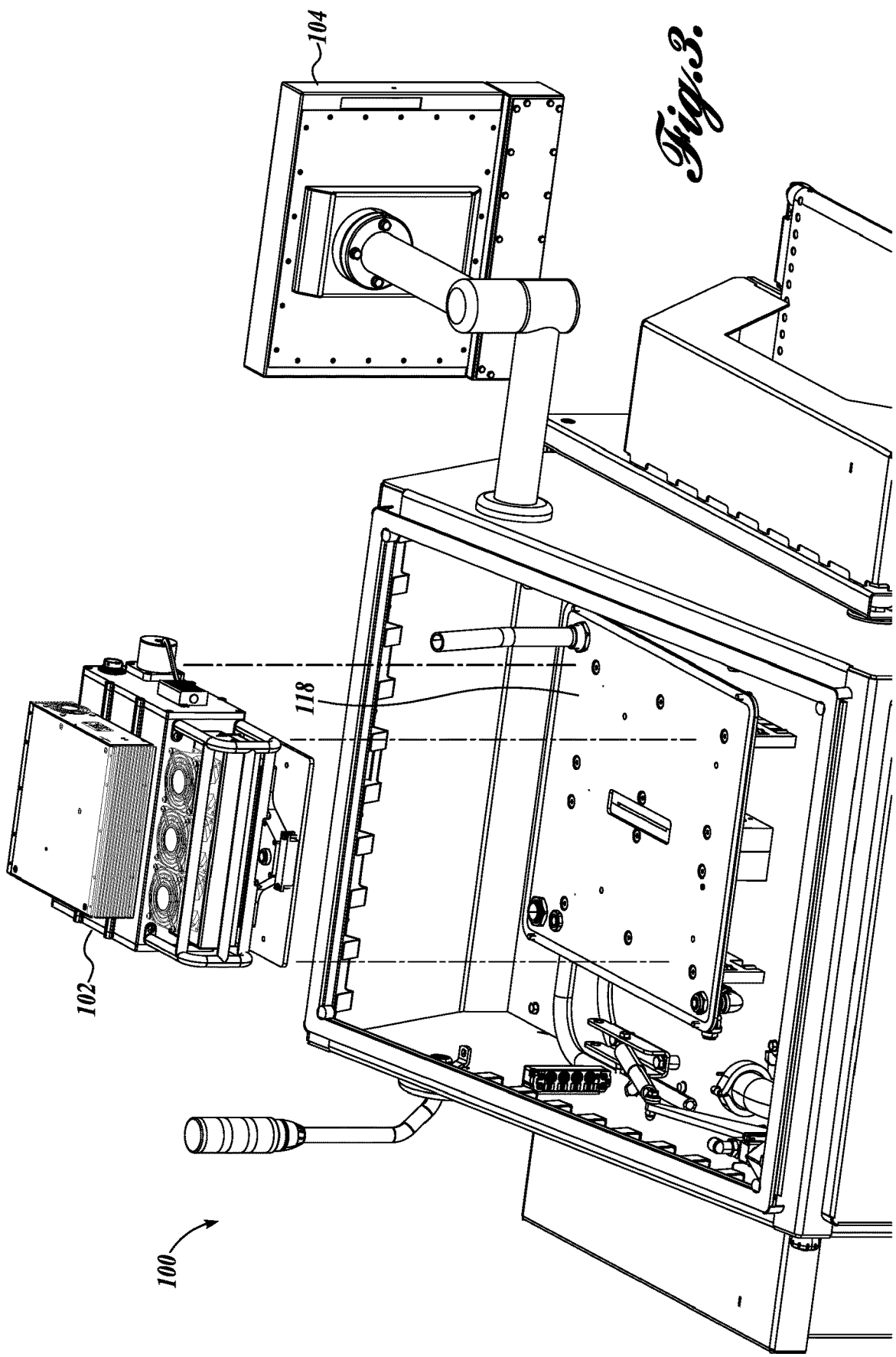
FIG. 3 is a diagrammatical close-up illustration of the interface of a replaceable X-ray source.

Referring to FIG. 3, the X-ray source 102 is unfastened from the scanner, such as by the removal of one or more screws, and then lifted out with the assistance of a small hoist, for example.

In one embodiment, each interchangeable electromagnetic wave source 102 can be built having the same pattern of bolt holes, for example, to allow bolting to the mounting plate 118.

Further, in one embodiment, each interchangeable electromagnetic wave source 102 is built so that upon resting on the mounting plate 118, each interchangeable electromagnetic wave source 102 emits a beam of electromagnetic waves in the same space as every other interchangeable electromagnetic wave source. This feature would allow changing electromagnetic wave sources 102 without requiring further alignment or would only require minimal alignment.

In one embodiment, interchangeable electromagnetic wave sources 102 are built without requiring further alignment or require minimal alignment once installed on the mounting plate 118.

Several types of sources 102 or with different power options can be made in similar housing size so as to be interchangeable.

In one embodiment, the X-ray source 102 can include an edge card connector or any other standard connector to allow the X-ray source 102 to plug into a matching socket on the scanner 100 to communicate to other components in the scanner 100.

The cartridge 116 of FIG. 2 for the detector 110 and the mounting plate 118 of FIG. 3 for the X-ray source 102 can be built to close tolerances. Consequently, it becomes possible to replace the X-ray source 102 and detector 110 so that upon replacement, the new components of the scanner 100 are in proper alignment upon installation.

In other embodiments, the cartridge 116 and mounting plate 118 can be modified. For example, instead of sliding out of the scanner 100, the cartridge 116 can remain in the scanner 100, while the detector 110 slides out. The mounting plate 118 may also be removed with the electromagnetic wave source 102, instead of remaining in the scanner 100.

Once the electromagnetic wave source 102 and detector 110 are replaced with new or different electromagnetic wave source 102 and detector 110, the replacements are selected from a menu on touch screen of the human machine interface (HMI) 104.

Figure 4:
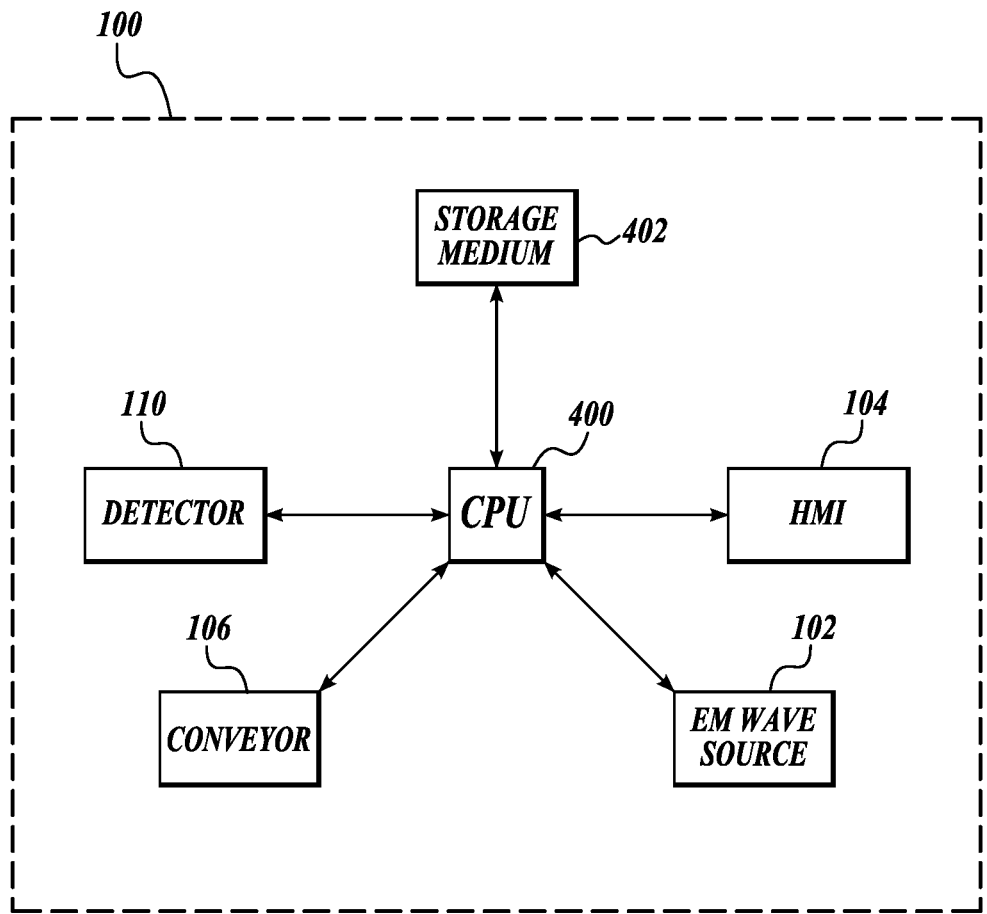
FIG. 4 is a schematic illustration of the components that comprise a control system.

FIG. 4 is a schematic illustration of some of the components that make up a control system. The control system comprises various components that communicate with one another over wired or wireless circuits to carry out certain routines or methods to operate the scanner 100.

The scanner 100 includes one or more central processing units 400 (CPUs). The central processing units 400 include the electronic circuitry that carries out instructions of software or firmware by performing the basic arithmetic, logic, controlling, operating system, and input/output operations specified by the instructions.

Although FIG. 4 shows an embodiment where the scanner 100 includes the one or more CPUs 400, in another embodiment, the CPUs 400 can reside externally from the scanner 100, for example in a remote server providing Cloud computing resources.

In one embodiment, the scanner 100 is located at a customer's physical location, and the CPUs 400 reside in a remote server at the service vendor (e.g. the provider or manufacturer of the scanner, or a Cloud computing service provider).

In one embodiment, the scanner 100 includes a tangible non-transitory storage medium/computer readable medium 402 that communicates with the one or more processing units 400. The storage medium 402 in addition to storing an operating system can store firmware or software to perform a set of instructions for performing an application training method for creating a set of operating parameters for a new inspection application.

Although FIG. 4 shows an embodiment where the scanner 100 includes the storage medium 402, in another embodiment, the storage medium 402 can reside externally from the scanner 100, for example in a remote server providing Cloud computing resources.

In one embodiment, the scanner 100 is located at a customer's physical location, and the storage medium 402 resides in a remote server at the service vendor (e.g. the provider or manufacturer of the scanner, or a Cloud computing service provider).

The one or more CPUs 400 also communicate with the electromagnetic wave source 102 (e.g., X-ray source). The one or more CPUs 400 can control the on or off state of the electromagnetic wave source 102. The one or more CPUs 400 can control the energy level, wavelength, amplitude and the like of the electromagnetic wave source 102.

The one or more CPUs 400 can control the conveyor belt 106. The one or more CPUs 400 can control the on or off state of the conveyor belt 106 to synchronize with the electromagnetic wave source 102. The one or more CPUs 400 can control the linear speed of the conveyor belt 106 to synchronize the speed with the detector 110.

The one or more CPUs 400 also communicate with the HMI 104. The HMI 104 can include a touchscreen display to allow the operator to start and set operating functions of the scanner 100. For example, the HMI 104 can have menus for the operator to select various parameters for running the scanner or to set up the scanner for a new inspection application.

In one embodiment, the scanner 100 includes a menu and/or a display for the operator to start and run an automatic training method to create a new inspection application.

The control system including one or more central processing units 400 and storage medium 402 is programmed to recognize a replacement in either the detector 110 or the electromagnetic wave source 102. For example, each component can have a unique identification signal that is recognized by the control system on plugging a new detector 110 or new electromagnetic wave source 102 into the scanner 100. A table of each component with its unique identification signal can be stored in the storage medium 402. The storage medium 402 can also store operating parameters that are matched with each unique identification signal.

Furthermore, the control system including one or more central processing units 400 and storage medium 402 can perform calibration tests whenever a new detector 110 or electromagnetic wave source 102 is installed to optimize the operating parameters.

In one embodiment, the scanner 100 carries out the inspection of products by recognizing a response of the electromagnetic wave emissions due to particular contaminants.

In order to create an inspection application, the scanner first learns to recognize the patterns caused by undesirable contaminants in products.

In one embodiment, a particular contaminant is run through the scanner under a matrix of operating parameter combinations. In this manner, the scanner 100 learns how to recognize the undesirable contaminant by the response at the detector 110, and the operating parameters that caused such response.

Generally, a non-contaminated product will produce a continuous curve of detected energy, but, a contaminant in the product will attenuate the electromagnetic wave emissions to cause a discontinuity, such as a spike or a dip in the energy curve.

In addition, the scanner 100 learns which operating parameter settings provide the optimal production to maximize productivity in terms of inspecting the most product with a high confidence level near or at 100% that none of the product determined to pass contains the contaminant.

Figure 5:
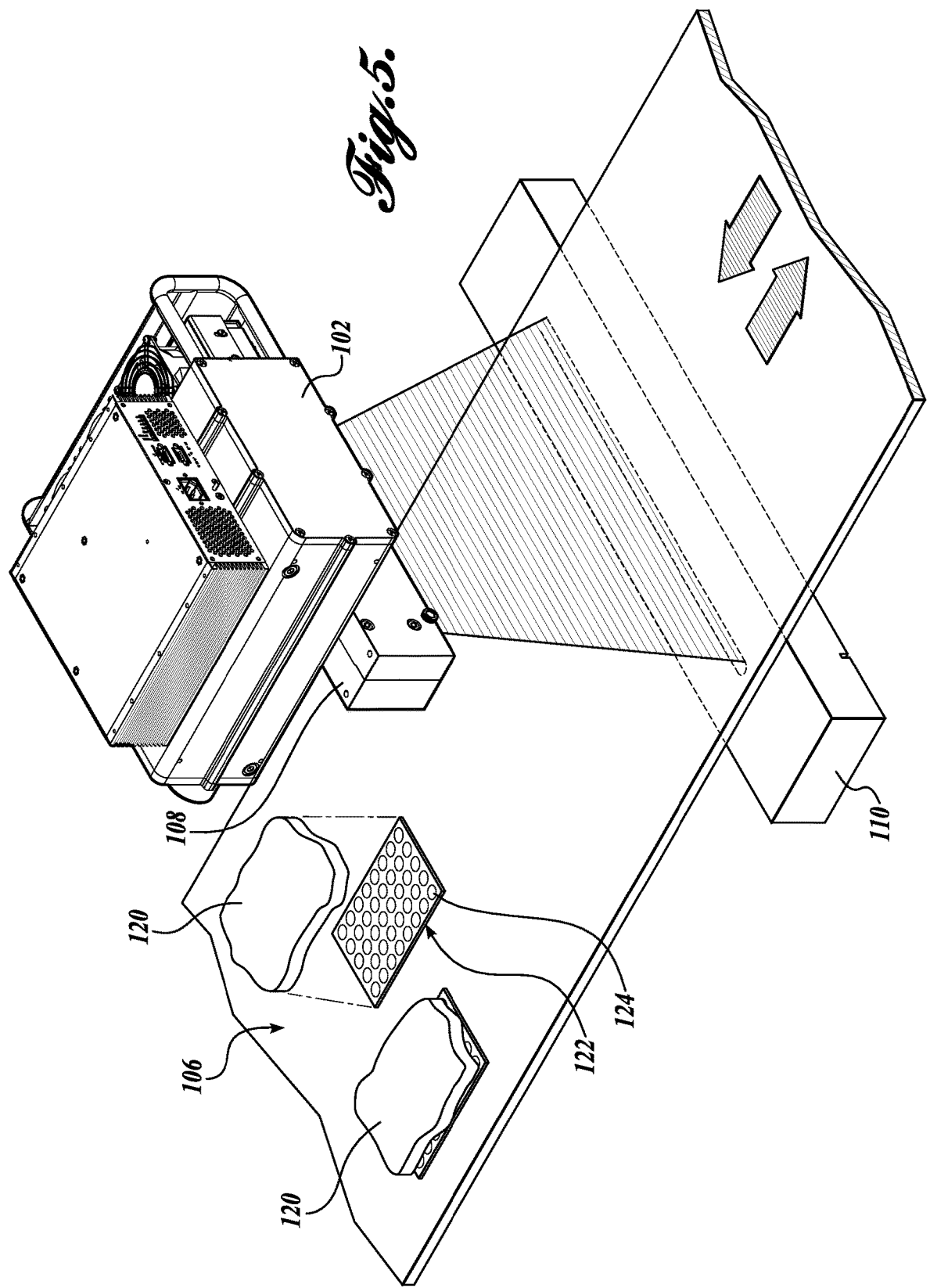
FIG. 5 is a diagrammatical illustration of the scanner performing application training.

Referring to FIG. 5, to run a training application for training the scanner 100 to inspect for contaminants, acceptable passable product 120 is placed on the conveyor belt 106 with test cards 122 placed under the product 120.

In one embodiment, test cards 122 are embedded with contaminants 124 of varying sizes, generally in an ordered fashion. One or more test cards 122 can be made with all the possible contaminant sizes. In one embodiment, the test cards 122 can vary in both type of contaminant and size of contaminant. Contaminants 124 to be tested include, for example, organic or inorganic debris, such as wood, hairs, insect parts, dirt, sand, rocks, glass, metal, bone, etc. Different test cards 122 can be placed under product 120 in such a way as to obtain data for several types of contaminants simultaneously.

The storage medium 402 is used to record the type and size of contaminant of the test cards 122, the operating parameters, such as X-ray source wattage or current, conveyor speed, and the results from the detector 110 for each tested condition.

After the testing is completed, a database is stored in the storage medium 402 where the test conditions and the corresponding results can be called up at a future time to run an inspection application on untested product during actual production.

Once the various test cards 122 are placed under the product 120, the control system including one or more central processing units 400 and storage medium 402 will start the conveyor belt 106 to pass the product 120 thru the electromagnetic wave source 102 and detector 110.

Once the product 120 passes the electromagnetic wave emissions, the conveyor belt 106 will stop and reverse direction to allow the product 120 to pass again. This back and forth motion will continue for as many times as needed to step thru the combinations of operating parameters.

The combinations of operating parameters are incrementally adjusted by the control system including one or more central processing units 400 and storage medium 402. For example, one operating parameter can be incremented one at a time to test the possible permutations of the operating parameters through their operating ranges. In this way, the effects of each of the operating parameters can be measured, and the combination of operating parameters that can detect the smallest contaminant is recorded, for example.

In one embodiment, the scanner 100 is trained to inspect for conforming products 120. A conforming product is a product that that conforms to predetermined standards of weight, shape, size, color, density, and the like.

In one embodiment, the scanner 100 is trained to inspect for conforming products 120 without using test cards 122. In such embodiment, conforming products are passed under the electromagnetic wave source 102 to be exposed the electromagnetic wave emissions.

In one embodiment, multiple passes of multiple conforming products 120 will allow gathering a plurality of data, and a composite of the responses for a conforming product can be built from the data, stored in the storage medium 402, and later used when inspecting product unknown to be conforming by comparing the response for a conforming product stored in the storage medium 402 to real time responses measured from product unknown to be conforming.

In one embodiment, training the scanner 100 to detect conforming product can include passing nonconforming product under the electromagnetic wave source 102. This allows the scanner 100 to be further trained to recognize nonconforming product as well as recognizing conforming product.

Figure 6:
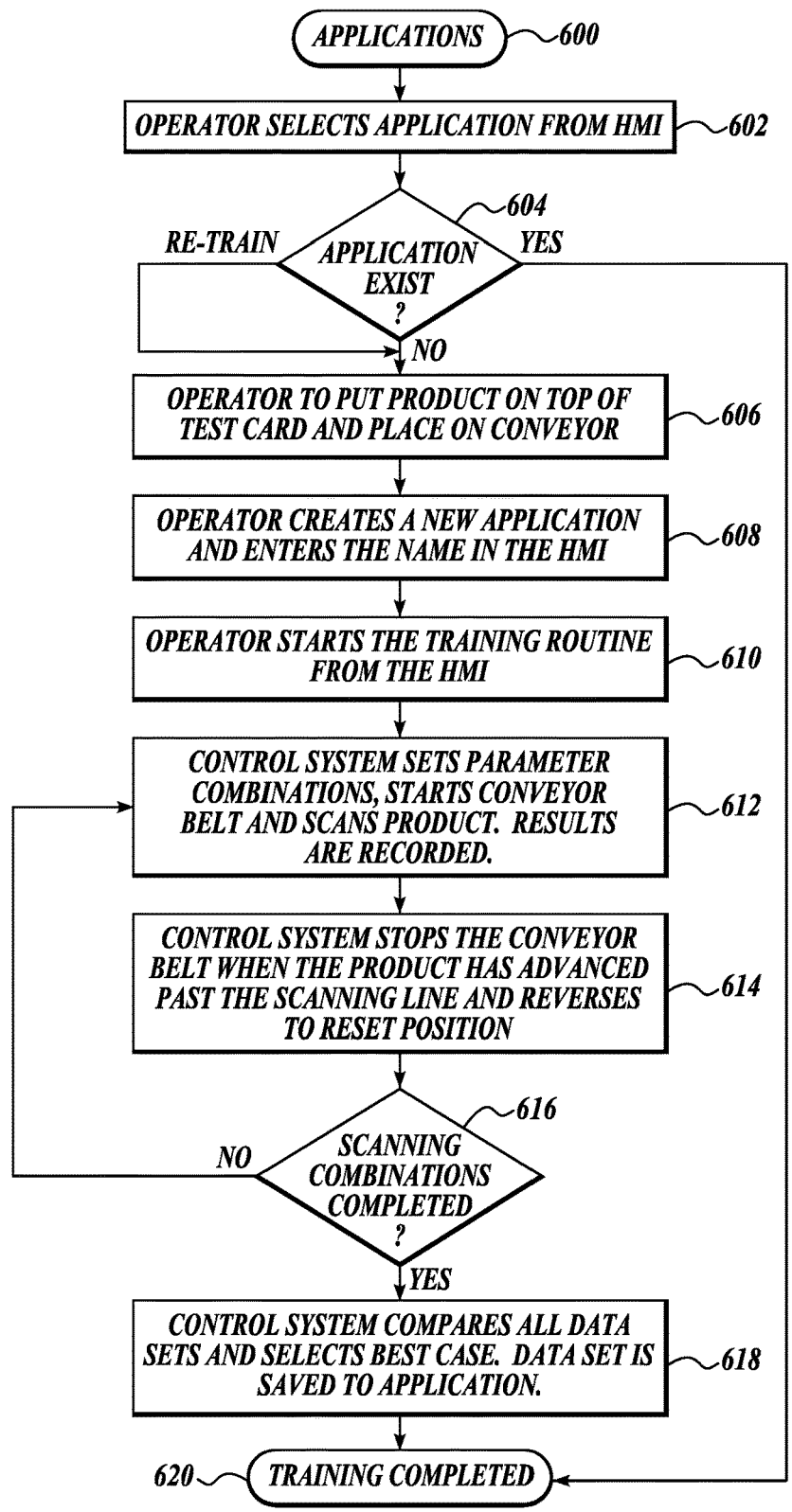
FIG. 6 is a flow diagram of a method for application training according to the disclosure.

Referring to FIG. 6, one embodiment of a method for managing applications is illustrated. In particular, the method of FIG. 6 is configured to implement a subroutine of building a new application by training the scanner 100 for the new application. Steps in the method can be computer-implemented steps. In block 602 the operator selects the application from the HMI 104.

In this context, "application" can refer to the inspection program for inspecting a certain type of product. From block 602, the method enters block 604. Applications include, but are not limited, inspecting for contaminants in product or inspecting for defects in product, i.e., nonconforming product.

In block 604, the method determines whether the application exists in the database in storage medium 402. If the determination in block 604 is Yes, indicating that the application already exists, the method jumps to block 620 indicating that application training has been completed, and the operator may proceed with an actual inspection according to such application.

If the determination in block 604 is No, indicating that no such application exists in the storage medium 402, the method enters block 606 signifying that training of the scanner 100 is needed to build the new application. In the embodiment of FIG. 6, a training method of the scanner 100 is illustrated when training for contaminants.

However, in one embodiment, the training method can be modified to eliminate the use of test cards, and conforming product or nonconforming product is run to train the scanner 100 to recognize or detect for conforming or nonconforming product.

Block 606 is a manual preparation step for the operator to place the product on top of each of the test cards 122 to be used in the application training. From block 606, the method enters block 608.

In one embodiment, block 606 can be omitted if the scanner 100 is being trained to recognize or detect conforming or nonconforming product or both.

In block 608, the operator creates a new training application and enters an identifying name through the touch screen on the HMI 104. Several menus can be used to provide a plurality of application names. For example, application names can be based on products, such as chicken thighs, chicken breasts, chicken wings, further hierarchical choices can include boneless or bone-in and skinless or with skin, and for fish fillets, further hierarchical choices can include the name of the fish, such as cod, salmon, tilapia, and the like.

The storage medium can store and keep track of the applications first from the base product, and further based on any hierarchical choices relating to the base product. From block 608, the method enters block 610.

In block 610, the operator starts the training routine from the touch screen on the HMI 104. In block 610, the operator may also manually enter the test conditions. From block 610, the method enters block 612.

In block 612, the control system including one or more central processing units 400 and storage medium 402 sets the parameter combinations to be tested, such as, the increment size for each parameter increase or decrease, the conveyor speed, etc.

In block 612, the conveyor belt 106 is started, and the data from the first pass through the electromagnetic wave source emissions is recorded. From block 612, the method enters block 614.

In block 614, the control system including one or more central processing units 400 and storage medium 402 stops the conveyor belt 106 when the product 120 has advanced past the electromagnetic wave source emissions, then, the control system including one or more central processing units 400 and storage medium 402 reverses the conveyor belt 106 to the reset position, ready for the next pass with a new set of parameters or only a single change of one parameter. From block 614, the method enters block 616.

In block 616, a determination is made whether all the parameter combinations have been tested. If the determination in block 616 is No, indicating that parameter combinations still need to be tested, the method returns to repeat block 612 and block 614, where in block 612, the next combination is set by incrementing one or more of the operating parameters according to pre-set rules, and in block 614, where the control system including one or more central processing units 400 and storage medium 402 senses the passing of the product 120 through the electromagnetic wave source emission.

However, if the determination in block 616 is Yes, indicating that all parameter combinations have been tested, the method enters block 618.

In block 618, the control system including one or more central processing units 400 and storage medium 402 compares all the data sets in the present training routine and selects the "best case" depending on the particular purpose of the training application.

In one embodiment of a training application, a best case is to detect the smallest possible contaminant in the test card 122, where a test card will typically contain the range of samples from easy to find to very difficult to find. Once the smallest possible contaminant is detected, the operating conditions that resulted in finding the contaminant are recorded for future use in inspections.

In one embodiment of a training application, the training application not only considers whether or not product 120 has contaminants and the contaminant size, but also the number of contaminants, wherein a limit on the amount of contaminant or a limit on the size of contaminant or a combination of both amount and size may be placed. Such limits define an acceptable passable product 120.

In one embodiment, a product 102 that does not pass the limits and can further be tracked and rejected from the conveyor belt 106.

In one embodiment of a training application, the training application is not detecting for contaminants. For example, a training application is for training the scanner 100 for recognizing conforming or nonconforming product 120 with respect to size, color, shape, or the like. When a nonconforming product is detected that has a defect in either size, color, or shape compared to the trained-for size, color, or shape, the nonconforming product is tracked and rejected.

For selecting the data set to be used in future inspection applications, the CPUs 400 can carry out statistical algorithms to analyze data, to recognize patterns, apply statistical algorithms to select an optimized set of parameters. Such statistical algorithms can use principal component analysis, ANOVA, clustering methods, and linear regression, for example. From block 618, the method enters block 620, indicating that the training is completed.

Once the best data set is selected, the parameters corresponding to the best case are stored under the application name given at the start in block 608. When an application name is selected that has already completed the training method, the parameters corresponding to the application name are used for real-time inspection of uninspected product with the scanner 100.

Although FIG. 6 shows one embodiment of a method and training subroutine, the steps can be modified to achieve substantially the same result. For example, the order of any two or more steps can be reversed if the result is substantially the same, or any two or more steps can be combined into a single step if the result is substantially the same, or any one step can be divided into two or more steps, or additional steps (not shown) can be included if the result is substantially the same.

In one embodiment, a scanner 100 comprises an electromagnetic wave source 102; and a detector 110 positioned to measure emissions from the electromagnetic wave source, wherein the electromagnetic wave source comprises a first technology, and the electromagnetic wave source is interchangeable with a second electromagnetic wave source comprising a second technology.

In one embodiment, the first and second technology comprise different wavelengths from the electromagnetic spectrum.

In one embodiment, the scanner 100 further comprises a conveyor belt 106 interposed between the electromagnetic wave source and the detector.

In one embodiment, the detector 110 comprises a first technology, and the detector is interchangeable with a second detector comprising a second technology.

In one embodiment, the electromagnetic wave source 102 is an X-ray source.

In one embodiment, the detector 110 can comprise photodiode arrays and other technologies.

In one embodiment, the scanner 100 is configured to communicate with a storage medium 402 having instructions stored thereon to perform a method for training the scanner for an inspection application, the method comprising: with a control system 400, 402, operating the electromagnetic wave source 102 to generate electromagnetic wave emissions at a plurality of combinations of parameters; with the control system, moving a conveyor belt 106 to expose product 120 having a plurality of contaminants 124 of different sizes to the emissions generated at more than one combination of parameters; with the control system, recording attenuated emissions that pass through the product at more than one combination of parameters; and with the control system, selecting a combination of parameters to use when inspecting for the contaminant.

In one embodiment, the storage medium 402 is a remote storage medium.

In one embodiment, a tangible computer readable medium 402 having instructions stored thereon to perform a method for training a scanner 100 for an inspection application, the method comprising: with a control system 400, 402, operating an electromagnetic wave source 102 to generate electromagnetic wave emissions at a plurality of combinations of parameters; with the control system, moving a conveyor belt 106 to expose product 120 having a plurality of contaminants 124 of different sizes to the emissions generated at more than one combination of parameters; with the control system, recording attenuated emissions that pass through the product at more than one combination of parameters; and with the control system, selecting a combination of parameters to use when inspecting for the contaminant.

In one embodiment, a method for training a scanner 100 to perform an inspection application, the method comprising: operating an electromagnetic wave source 102 to generate electromagnetic wave emissions at a plurality of combinations of parameters; moving a conveyor belt 106 to expose product having a plurality of contaminants of different sizes to the emissions generated at more than one combination of parameters; recording attenuated emissions that pass through the product at more than one combination of parameters; and selecting a combination of parameters to use when inspecting for the contaminant.

In one embodiment, the method further comprises placing a test card 122 containing the contaminants of different sizes beneath the product.

In one embodiment, the method further comprises reversing the direction of the conveyor belt 106 after exposing the product to the emissions after each of the more than one combinations of parameters.

In one embodiment, the electromagnetic wave source 102 is an X-ray source.

In one embodiment, a control system 400, 402 sets the combinations of parameters.

In one embodiment, a scanner 100 comprises an electromagnetic wave source 102; and a detector 110 positioned to measure emissions from the electromagnetic wave source, wherein the detector 100 comprises a first technology, and the detector is interchangeable with a second detector comprising a second technology.

In one embodiment, detector technologies are selected from the group consisting of photodiode arrays, CCD, and CMOS.

In one embodiment, the scanner 100 is configured to communicate with a storage medium 402 having instructions stored thereon to perform a method for training the scanner for an inspection application, the method comprising: with a control system 400, 402, operating the electromagnetic wave source 102 to generate electromagnetic wave emissions at a plurality of combinations of parameters; with the control system, moving a conveyor belt 106 to expose conforming product 120 to the emissions generated at more than one combination of parameters; with the control system, recording attenuated emissions that pass through the conforming product at more than one combination of parameters; and with the control system, selecting a combination of parameters to use when inspecting product unknown to be conforming.

In one embodiment, a tangible computer readable medium 402 having instructions stored thereon to perform a method for training a scanner 100 for an inspection application, the method comprising: with a control system 400, 402, operating an electromagnetic wave source 102 to generate electromagnetic wave emissions at a plurality of combinations of parameters; with the control system, moving a conveyor belt 106 to expose conforming product 120 to the emissions generated at more than one combination of parameters; with the control system, recording attenuated emissions that pass through the conforming product at more than one combination of parameters; and with the control system, selecting a combination of parameters to use when inspecting product unknown to be conforming.

In one embodiment, a method for training a scanner 100 to perform an inspection application, the method comprising: operating an electromagnetic wave source 102 to generate electromagnetic wave emissions at a plurality of combinations of parameters; moving a conveyor belt 106 to expose conforming product to the emissions generated at more than one combination of parameters; recording attenuated emissions that pass through the conforming product at more than one combination of parameters; and selecting a combination of parameters to use when inspecting product unknown to be conforming.

In one embodiment, the method further comprises selecting data from the recorded attenuated emissions that defines a conforming product.

While illustrative embodiments have been illustrated and described, it will be appreciated that various changes can be made therein without departing from the spirit and scope of the invention.

The invention claimed is:

1. A scanner, comprising:
   an electromagnetic wave source;
   a detector positioned to measure emissions from the electromagnetic wave source;
   wherein the electromagnetic wave source comprises a first technology, and the electromagnetic wave source is interchangeable with a second electromagnetic wave source comprising a second technology,
   a human machine interface to select a replacement for the electromagnetic wave source, and
   a control system including one or more central processing units and a tangible non-transitory computer readable medium recognizes the replacement for the electromagnetic wave source, and the tangible non-transitory computer readable medium stores operating parameters matched to the replacement for the electromagnetic wave source.

2. The scanner of claim 1, wherein the first technology and the second technology comprise different wavelengths from an electromagnetic spectrum.

3. The scanner of claim 1, further comprising a conveyor belt interposed between the electromagnetic wave source and the detector.

4. The scanner of claim 1, wherein the detector comprises a first technology, and the detector is interchangeable with a second detector comprising a second technology.

5. The scanner of claim 1, wherein the electromagnetic wave source is an X-ray source.

6. The scanner of claim 1, wherein the detector comprises photodiode arrays and other technologies.

7. A scanner, comprising:
   an electromagnetic wave source;
   a detector in a position in the scanner to measure emissions from the electromagnetic wave source, a conveyor belt interposed between the electromagnetic wave source and the detector;

wherein the detector comprises a first technology, and the detector is interchangeable with a replacement detector comprising a second technology, wherein the replacement detector is capable of being placed in the position of the detector in the scanner;

a human machine interface to select the replacement detector for the detector, and a control system including one or more central processing units and a tangible non-transitory computer readable medium recognizes the replacement detector, and the tangible non-transitory computer readable medium stores operating parameters matched to the replacement detector.

8. The scanner of claim 7, wherein the first technology and the second technology are different, the first technology and the second technology are selected from the group consisting of photodiode arrays, CCD, and CMOS.

9. A method for training a scanner to perform an inspection application, the method comprising:

operating an electromagnetic wave source to generate electromagnetic wave emissions at a plurality of combinations of parameters;

moving a conveyor belt to expose a product having a plurality of contaminants of different sizes to the electromagnetic wave emissions generated at more than one combination of parameters;

recording attenuated electromagnetic wave emissions that pass through the product at more than one combination of parameters; and selecting a combination of parameters to use when inspecting a product for a contaminant.

10. The method of claim 9, further comprising placing a test card containing the plurality of contaminants of different sizes beneath the product.

11. The method of claim 9, further comprising reversing a direction of the conveyor belt after exposing the product to the electromagnetic wave emissions after each of the more than one combination of parameters.

12. The method of claim 9, wherein the electromagnetic wave source is an X-ray source.

13. The method of claim 9, wherein a control system selects the combination of parameters.

14. A method for training a scanner to perform an inspection application, the method comprising:

operating an electromagnetic wave source to generate electromagnetic wave emissions at a plurality of combinations of parameters;

moving a conveyor belt to expose a conforming product to the electromagnetic wave emissions generated at more than one combination of parameters;

recording attenuated electromagnetic wave emissions that pass through the conforming product at more than one combination of parameters; and selecting a combination of parameters to use when inspecting a product unknown to be conforming.

15. The method according to claim 14, further comprising selecting data from the recorded attenuated electromagnetic wave emissions that defines a conforming product.

* * * * *